April 25, 1961 M. KNOLL 2,981,862
X-RAY IMAGE AMPLIFIER STORAGE TUBES
Filed Oct. 31, 1958
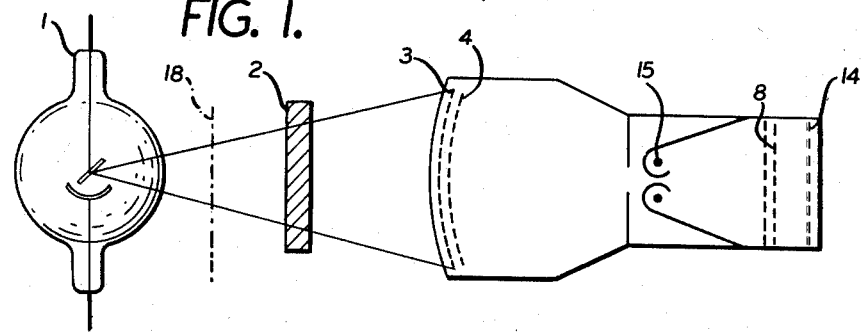
FIG. 1.
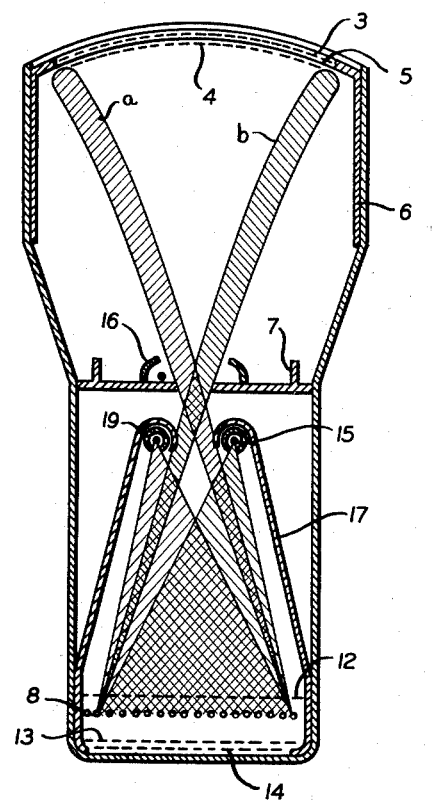
FIG. 2.
FIG. 3.
FIG. 4.
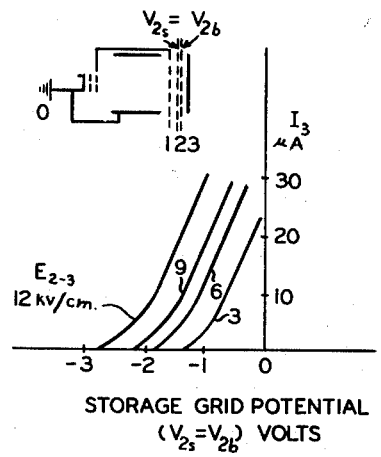
STORAGE GRID POTENTIAL
$(V_{2s}=V_{2b})$ VOLTS
INVENTOR
MAX KNOLL
BY
ATTORNEY

United States Patent Office 2,981,862
Patented Apr. 25, 1961

2,981,862

X-RAY IMAGE AMPLIFIER STORAGE TUBES

Max Knoll, Princeton, N.J.
(21 Arcisstrasse, Munich 2, Germany)

Filed Oct. 31, 1958, Ser. No. 771,129

9 Claims. (Cl. 315—11)

It is known to use X-ray image amplifier tubes in which an X-ray image to be amplified is projected on a luminescent layer in close contact with a light sensitive photolayer consisting e.g., of an antimony cesium compound. The electron beam emitted from this photolayer is then accelerated, and by an electro-optic projecting system, a minified electron-optical picture is produced on a luminescent screen. In this case, the energy of the original (light) picture is amplified (1) by the acceleration of the photo electrons, (e.g. from 5 to 20 kv.), and (2) by the reduction of the light omitting angle of the electron-optically minified picture on the final luminescent screen which can be inspected by the use of a magnifying glass. Such a device permits the exposure time of an X-rayed subject to be reduced by a factor of 10 to 1000 and more.

One of the objects of this invention is to reduce the exposure time further by introducing a viewing storage system of the electron lens raster type into an X-ray amplifier tube, and to use the electron current from the photoelectric layer for the writing of the electric charge pattern on the surface of the storage grid in this system.

A more specific object of the invention is to provide the further amplification exceeding that of an ordinary image amplifier by making the viewing beam current much higher than the photocurrent so that the stored pattern can be written in a much shorter time than the usual viewing time for an X-ray screen.

Still another object of the invention is to provide a much smaller voltage supply for example 4 kv. instead of 20 kv.

These and other objects of the invention will be more fully disclosed with reference to the accompanying drawings.

Fig. 1 shows an example of the general assembly of such a device, according to the invention.

Fig. 2 shows the design of the storage system in detail.

Fig. 3 shows parts of Fig. 2 on an enlarged scale.

Fig. 4 shows a viewing current characteristic.

In Fig. 1, the X-ray beam is derived from an X-ray source 1 for example a modern X-ray tube used for diagnostic medical purposes or an X-ray tube used for testing of materials or machine parts. After penetrating the body 2 to be analyzed the X-ray illuminates luminescent screen 3 which is in close optical contact with, but separated from photocathode 4 by a very thin glass layer indicated in Fig. 2 at 5.

Fig. 2 also shows originating from photolayer 4 as a result of acceleration by first anode 6, two elementary parts $a$, $b$ of the writing beam which, as a result of the electron optical field produced by photocathode 4, first anode 6 and second anode 7 and produce a minified picture of X-ray screen 1 on the surface of storage grid 8.

Storage grid 8 consists of a fine metal mesh, as apparent from the enlargement of Fig. 3, made of nickel for example and covered with a thin layer, an element of which is shown at 9, of insulating material 10 such as calcium- or magnesium fluoride. The distance of grid elements 9 from each other depends on the resolution of the final picture desired.

The secondary electrons produced by the writing beam on the storage grid layer 10 are collected either by a collector grid 12 or by aluminum foil 13 protecting the final anode consisting of conducting luminescent screen 14.

The charge pattern impressed by the photoelectric (writing) beam on the surface of storage grid 8 controls the path of viewing beam which originates from ring filament 15 and is accelerated by auxiliary anode 16 and third anode 17. It then passes collector grid 12, storage grid 8 and is accelerated toward luminescent screen 14.

Storage systems of this type are well known and therefore not described in detail.

More specifically, the use of a viewing cathode ray beam as a writing beam is described by Knoll and Kazan, Viewing Storage Tube Advances in Electronics, New York 1956, which also shows that the viewing beam electrons must arrive in a direction perpendicular to the surface of the storage grid (not indicated in Fig. 2). This can be accomplished by using proper voltages between third anode 17 and collector grid 12.

As an example for operation of the tube, typical electrode voltages for the writing, reading and erasing cycle are given in the following table.

*Electronic voltages for operation of X-ray image amplifier storage tube (electrostatic system)*

|  | Writing, volts | Viewing, volts | Erasing, volts |
|---|---|---|---|
| Photolayer | −4,000 | 0 | 0 |
| Ring-Filament | off | −100 | −100 |
| 3rd anode | 0 | 2,000 | 2,000 |
| Collector Grid | 0 | 0 | 0 |
| Storage Grid | −100 | −100 | 100, Ω+2 |
| Storage Grid (Ins.) | −102→−100 | −102→−100 | −102 |
| Luminescent Screen | 0 | 4,000 | 0 |

All voltages are measured against collector grid 12 which is grounded during erasing. The entire active surface 11 of storage grid 8 is charged to −100 volts relative to collector grid 12 and −2 volts relative to its metallic support mesh 9.

Thus according to the characteristic Fig. 4 the viewing current cannot pass storage grid 8.

Before the writing beam starts, the picture shutter, schematically indicated in Fig. 1 at 18 is manually or automatically operated. Since the emission factor of storage layer 10 is greater than 1, the writing beam cuts positive potential grooves into the homogeneous negative potential plateau of storage layer 11, which, depending on their depth, allow the viewing current to pass storage grid 8 to a smaller or larger degree, thereby forming a bright picture on the last anode represented by conducting luminescent screen 14.

At the end of the writing period, picture shutter 18 is closed, and the viewing period is started by switching-in auxiliary or viewing cathode 19. The viewing duration may be increased by compensating the positive ion current landing on storage layer 10 by a pulsed flood beam as is known for viewing storage tubes. (see Knoll and Kazan cited above p. 292).

Furthermore, if only a modest brightness at final screen 14 is desired, the viewing screen electrodes such as 17, 16 and 19 may be replaced by the writing beam electrodes such as 4, 6, 7, respectively.

At the end of the viewing period, erasing is started by charging the storage grid potential and thus the storage grid surface 11 with +2 volts, by means of a pulse of relatively short duration, a few microseconds.

During this pulse, viewing beam electrons landing at surface 11 will charge it again uniformly to viewing beam cathode potential.

After the termination of the pulse, the potential of storage surface 11 will again drop to −2 volts relative to viewing beam cathode 15.

If the erasing time is not limited, for example, by the requirement of producing many pictures rapidly, erasing can also be achieved by omitting the viewing beam system and employing the writing beam system in the same manner as described above for the viewing cycle. This has the advantage that it is possible to view and to write with the same cathode, thereby facilitating the design. In this case, photocathode 4 has to be uniformly irradiated by a local light source such as an incandescent lamp which causes a corresponding viewing beam.

The current from the uniformly illuminated photosurface may then serve as an erasing beam by replacing the viewing beam electrodes with the writing beam electrodes. In this case, a bright light source can be used to irradiate the photocathode uniformly during erasing time.

The change of the storage surface potential during writing may not only be accomplished by secondary omission as described above but also by conductivity induced in the body of the storage layer by electronic bombardment, i.e., by the same process which is used in some signal converter storage tubes (e.g. graphechon see L. Pentak RCA Review, vol. 10, March 1949, pg. 59).

In this case, a higher voltage up to 20 kv. of the photocathode, a higher voltage across the storage layer, up to 100 volts, and therefore, a higher thickness of it, 10 to 100 microns, will be used.

I claim:

1. In an X-ray amplifier storage system, an X-ray image input and visual output tube having at one end a luminescent layer in close contact with a light sensitive photoelectric layer, and a viewing storage layer with adjacent luminescent screen arranged at the other end of said tube, means including intermediate electrodes for directing the electrons derived from said photoelectric layer under control of said first luminescent layer to said viewing storage layer, and means including a ring-shaped cathode for producing a viewing beam current which is substantially higher than the photoelectric current; said ring-shaped cathode being arranged substantially coaxial with said layers, closely surrounding the electrons passing from said photoelectric layer to said viewing storage layer and having a radial extension which is small compared to the cross-section of said tube.

2. System according to claim 1 wherein said photoelectric electrons have a crossover which is close to the center of the opening of said ring-shaped cathode.

3. System according to claim 1 wherein said luminescent and photoelectric layers are separated by a thin glass layer.

4. System according to claim 1 wherein said photoelectrons are accelerated by means of at least two anodes producing a minified picture of said luminescent screen on said storage layer and an intersection of edge portions of said photoelectronic beam near one of said anodes.

5. System according to claim 1 wherein such storage layer consists of a fine metal mesh covered with a thin layer of insulating material.

6. System according to claim 1 comprising a collector grid arranged in front of said storage layer and a transparent luminescent screen forming the final anode and arranged on the back of said storage layer, with a protective metal foil grid layer consisting of aluminum foil arranged between said storage layer and said final luminescent screen.

7. System according to claim 1 comprising means for providing viewing beam electrodes including a ring filament for producing the viewing beam, an auxiliary viewing cathode and a third anode, and means for providing writing beam electrodes including said photoelectric layer, an anode and a second anode, and means for replacing said viewing beam electrodes by said writing beam electrodes.

8. System according to claim 1 comprising means operative during viewing to compensate the positive ion current landing on said storage layer by means for producing a pulsed flood beam.

9. In a storing image amplifier system, a substantially cylindrical tube having at one end a light sensitive photoelectric layer, and a viewing storage layer arranged at the other end of said tube, means including intermediate electrodes for directing the electrons derived from said photoelectric layer to said viewing storage layer, and means including a ring-shaped cathode at substantially predetermined potential producing a viewing beam current which is substantially higher than the photoelectric current; said ring-shaped cathode surrounding the electrons passing from said photoelectric layer to said viewing storage layer near a crossover point of said electrons; said ring-shaped cathode being radially spaced from said tube at a distance which is large compared to the radial extension of said ring-shaped cathode.

References Cited in the file of this patent

UNITED STATES PATENTS

| 2,699,511 | Sheldon | Jan. 11, 1955 |
| 2,748,312 | Beintema | May 29, 1956 |
| 2,754,449 | Farnsworth | July 10, 1956 |

FOREIGN PATENTS

| 529,192 | Belgium | June 15, 1954 |

OTHER REFERENCES

Knoll: "Characteristics of a Transmission Control Viewing Storage Tube with Halftone Display," Proc. I.R.E., October 1954, pages 1501 and 1502.